(12) United States Patent
Goldentouch et al.

(10) Patent No.: US 10,504,235 B2
(45) Date of Patent: Dec. 10, 2019

(54) METHOD FOR GENERATING THREE DIMENSIONAL IMAGES

(71) Applicant: INUITIVE LTD., Ra'anana (IL)

(72) Inventors: Lev Goldentouch, Rishon Lezion (IL); Ziv Tsoref, Tel Aviv (IL); Samuel Lifsches, Tel Aviv (IL)

(73) Assignee: INUITIVE LTD., Ra'Anana (IL)

( * ) Notice: Subject to any disclaimer, the term of this patent is extended or adjusted under 35 U.S.C. 154(b) by 146 days.

(21) Appl. No.: 15/391,267

(22) Filed: Dec. 27, 2016

(65) Prior Publication Data

US 2018/0182117 A1 Jun. 28, 2018

(51) Int. Cl.
*G06K 9/00* (2006.01)
*G06T 7/593* (2017.01)
*H04N 13/00* (2018.01)
*H04N 13/111* (2018.01)
*H04N 13/207* (2018.01)
*H04N 13/239* (2018.01)
*H04N 13/128* (2018.01)

(52) U.S. Cl.
CPC ............ *G06T 7/593* (2017.01); *H04N 13/00* (2013.01); *H04N 13/111* (2018.05); *H04N 13/128* (2018.05); *H04N 13/207* (2018.05); *H04N 13/239* (2018.05); *G06T 2207/10012* (2013.01); *G06T 2207/10024* (2013.01); *G06T 2207/20076* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 5,719,954 A * | 2/1998 | Onda ................... | G06K 9/20 356/611 |
| 6,195,389 B1 * | 2/2001 | Rodriguez ............. | H04N 19/51 375/240.16 |
| 9,373,171 B2 * | 6/2016 | Barone .................. | G06T 7/593 |
| 9,886,763 B2 * | 2/2018 | Zhang .................. | G06K 9/6211 |

* cited by examiner

*Primary Examiner* — Fred H Hu
(74) *Attorney, Agent, or Firm* — Browdy and Neimark, PLLC

(57) ABSTRACT

A method is provided for reconstructing a three dimensional image, comprising: providing a pair of stereoscopic images captured by two image capturing devices; retrieving disparity data from the pair of stereoscopic images; using retrieved disparity data to determine contours of an object present in the pair of the stereoscopic images captured; selecting a pixel belonging to that object; establishing a search area at the vicinity of the selected pixel; determining values for various disparity candidates, wherein the determined values correspond to one or more chosen hypothesis associated with the search area; testing the one or more chosen hypothesis and selecting an hypothesis which best fits the selected pixel and its neighboring pixels; executing a stereo matching algorithm using data retrieved from the captured images while using the values of disparity candidates that correspond to the chosen hypothesis; and reconstructing the three dimensional image based on the results obtained.

15 Claims, 6 Drawing Sheets

METHOD FOR GENERATING THREE DIMENSIONAL IMAGES

TECHNICAL FIELD

The present disclosure generally relates to methods for using optical devices, and more particularly, to methods that enable stereoscopic reconstruction of three dimensional images.

BACKGROUND

A stereoscopic camera arrangement is an apparatus made of two camera units, assembled in a stereoscopic module. Stereoscopy (also referred to as "stereoscopics" or "3D imaging") is a technique for creating or enhancing the illusion of depth in an image by means of stereopsis. In other words, it is the impression of depth that is perceived when a scene is viewed with both eyes by someone having normal binocular vision, which is responsible for creating two slightly different images of the scene in the two eyes due to the eyes'/camera's different locations.

Combining 3D information derived from stereoscopic images, and particularly for video streams, requires search and comparison of a large number of pixels to be held for each pair of images, each of which derived from a different image capturing device. For example, in a case of a 2MP sensor operating at 60 fps (frames per second) and generating 16 bpp (bits per pixel), the bit rate would be a 4 MB per frame or over 240 MB per second. This amount of information makes it virtually impossible (particularly for consumer products such as laptops and tablets) to have it processed or even stored for a short while, as to do so would require resources that are usually unavailable in consumer products, given their expected target prices.

Depth calculation under real time conditions typically consumes quite a substantial amount of the processing device's available CPU.

For carrying out depth calculation using rectified stereo images, the depth is calculated by applying the disparity between the two images.

A hardware chip that determines depth from stereoscopic images, generates a set of most likely disparity candidates for each pixel. Obviously, there is a tradeoff between spatial resolution and disparity noise.

Therefore, a new solution is required to enable overcoming this problem, and the present invention seeks to provide such a solution.

SUMMARY OF THE DISCLOSURE

The disclosure may be summarized by referring to the appended claims.

It is an object of the present disclosure to provide a method for determining depth from stereoscopic images.

It is another object of the present invention to provide a solution for overcoming the conflict that exists between spatial resolution and disparity noise in the process of generating a set of disparity candidates for each pixel.

It is another object of the present invention to provide a solution for determining depth of a 3-D image by which low-noise disparity candidates are applied over a certain area (neighborhood) for a secondary high-resolution disparity search carried out over selected candidates.

It is another object of the present invention to provide a solution for determining depth of a 3-D image by selecting a disparity calculating mechanism which is adapted to enable balancing between noise level and resolution level, so that eventually the quality of the end result will be in accordance with the user preferences.

Other objects of the present invention will become apparent from the following description.

According to a first embodiment of the disclosure, there is provided a method for reconstructing a three dimensional image, the method comprises the steps of:

providing a pair of stereoscopic images captured essentially simultaneously by two image capturing devices;

retrieving disparity data from the pair of stereoscopic images;

using retrieved disparity data to determine contours of an object present in the pair of the stereoscopic images captured;

selecting at least one pixel belonging to the object;

establishing a search area at the vicinity of the at least one selected pixel to enable identifying disparity candidates associated with objects located at the vicinity of the object whose contour was determined;

determining values for the identified disparity candidates, wherein the determined values correspond to one or more chosen hypothesis associated with the search area;

testing the one or more chosen hypothesis and selecting an hypothesis which best fits the at least one selected pixel and its neighboring pixels;

executing a stereo matching algorithm using data retrieved from the pair of corresponding captured images while using the values of one or more identified disparity candidates that correspond to the chosen hypothesis; and reconstructing the three dimensional image based on the results of the stereo matching algorithm.

According to another embodiment, the method comprises an iterative process which includes receiving data that relates to disparity candidates obtained from a low-noise iteration and relying on the data received to execute a new high-resolution iteration.

In accordance with another embodiment, the method comprises retrieving data that relates to disparity candidates over a group of pixels present in the area located at the vicinity of the at least one selected pixel.

By yet another embodiment, the method further comprising a step of selecting a subset of disparity candidates from among the retrieved data that relates to the disparity, for re-evaluating the at least one selected pixel.

According to still another embodiment, the step of testing the one or more chosen hypothesis comprises using a high-resolution adaptive block matching of the area located around the at least one selected pixel.

In accordance with another embodiment, the objects located at the vicinity of the object whose contour was determined, are present at different depths of the image.

According to another aspect of the disclosure there is provided a system operative to reconstruct a three dimensional image, which comprises:

at least two image capturing devices for capturing essentially simultaneously at least two stereoscopic images;

at least one processor configured to:

retrieve disparity data from said at least two stereoscopic images;

apply retrieved disparity data to determine contours of an object present in the at least two stereoscopic images captured;

select at least one pixel belonging to the object;

establish a search area at the vicinity of the at least one selected pixel to enable identifying disparity candidates associated with objects located at the vicinity of the object whose contour was determined;

determine values for the identified disparity candidates, wherein the determined values correspond to one or more chosen hypothesis associated with the search area;

test the one or more chosen hypothesis and select an hypothesis which best describes the at least one selected pixel and its neighboring pixels;

execute a stereo matching algorithm using data retrieved from the at least two captured images while using the values of one or more identified disparity candidates that correspond to the chosen hypothesis; and reconstruct the three dimensional image based on the results of the stereo matching algorithm;

a memory means configured for storing information retrieved from the at least two image capturing devices along with disparity information that relates to the search area; and a delay buffer configured to enable synchronization between data received from the at least two image capturing devices.

The term "stereoscopic" (or "stereo") as used herein throughout the specification and claims, is used typically to denote a combination derived from two or more images, each taken by a different image capturing means, which are combined to give the perception of three dimensional depth. However, it should be understood that the scope of the present invention is not restricted to deriving a stereoscopic image from two sources, but also encompasses generating an image derived from three or more image capturing means.

The term "image" or "image capturing device" as used herein throughout the specification and claims, are used to denote a visual perception being depicted or recorded by an artifact (a device), including but not limited to, a two dimensional picture, a video stream, a frame belonging to a video stream, and the like.

BRIEF DESCRIPTION OF THE DRAWING

For a more complete understanding of the present invention, reference is now made to the following detailed description taken in conjunction with the accompanying drawing wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details and that the invention is not limited to the scope of these examples.

In addition, in the following description the term "reference sensor" should be understood as a sensor to which the image disparity is attributed, e.g., the right sensor or the left sensor. However, it should be understood by those skilled in the art, that a reference sensor may alternatively be a virtual reference sensor, generated by interpolating or extrapolating disparities that are visible by the left and right sensors, while filling in missing occlusion data.

Figure 1:
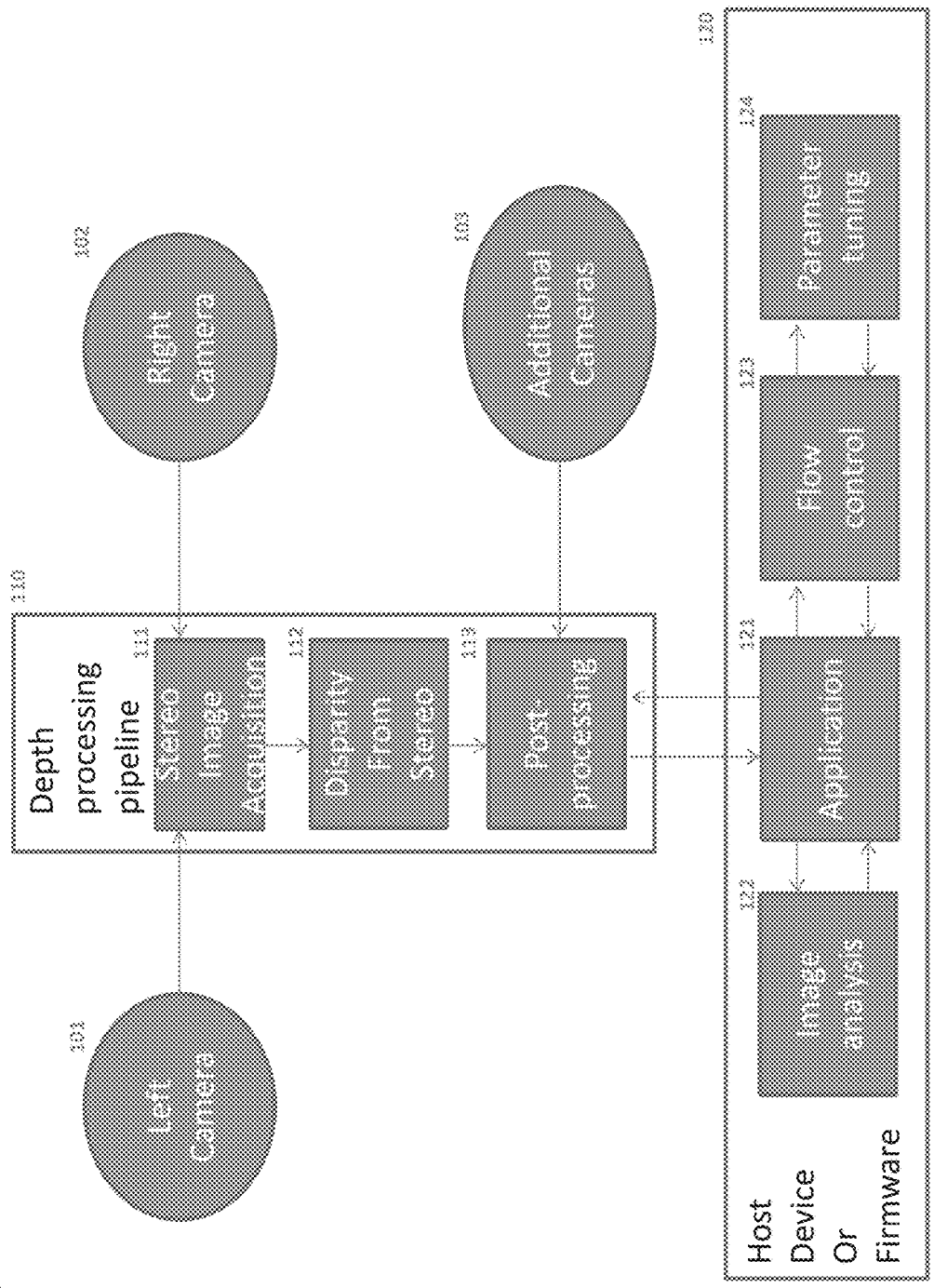
FIG. 1—is a block diagram illustrating a system construed according to an embodiment of the present invention.

FIG. 1 illustrates an exemplary system construed according to an embodiment of the present invention.

The system illustrated in this figure, comprises cameras 101 and 102 which capture essentially the same image but with some displacement caused by a baseline shift between the cameras. Data retrieved from these cameras are used in determining depth for a 3-D image that would be generated by combining the stereo images captured by these two cameras.

Optionally, an additional camera 103 (such as a webcam) may be used to provide an RGB image at a higher resolution. This RGB image needs to be combined with the depth image obtained by combining the two stereo images, in order to obtain a color image aligned with a 3D display.

Processing data in order to determine the applicable depth from the stereo images is carried out by a processor (referred to herein as depth processing pipeline 110), which may be implemented by using a Very-large-Scale Integration ("VLSI") circuit or a Field-Programmable Gate Array ("FPGA"). It may generate disparity and/or depth related data as well as RGB data retrieved from the cameras' inputs. The depth processing pipeline is controlled by using registers and shadow registers set by the host device (or firmware) 120.

Stereo image acquisition block 111 may be implemented as a hardware pipeline performing any one or more of the following functions: sensor control, sensor synchronization, geometric distortion correction, illumination correction as well as other processing required for generating a reliable 3D stereo image out of the data retrieved from cameras 101 and 102.

Disparity from stereo block 112 may be implemented by a hardware pipeline performing operations required to generate disparity data from a stereo image as will be further described in connection with FIG. 2.

Post processing block 113 may be implemented as a hardware for improving the image disparity and generating depth related data output. In some embodiments it may further include RGB related data received from the RGB camera.

Host device (or firmware) 120 is operative to control the depth processing pipeline 110 and to generate an output as required by the end user.

Application block 121 may execute various algorithms requested by the user, including face detection, skeleton tracking, hands tracking, gaze tracking, 3D object stitching, and the like.

Image analyzing block 122 is operative to carry out one or more of the following functions: image segmentation, object detection and motion analysis.

Flow control block 123 is configured to carry out control of complex flows, using multiple heterogeneous frame acquisition.

Parameter tuning block 124 may include generation of specific registers and shadow registers values, as well as modifying software and firmware parameters for each consecutive frame.

Figure 2:
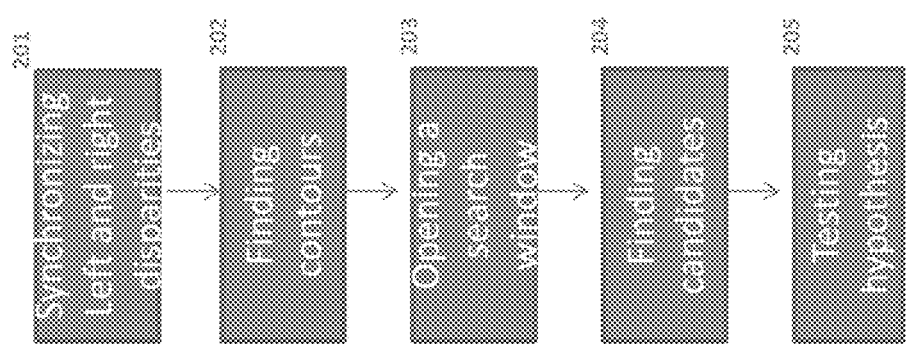
FIG. 2—is a flow chart demonstrating an embodiment of the present invention of a method for post-processing disparity candidates.

FIG. 2 exemplifies a flow chart of a process of implementing a method by which post processing block 113 operates.

First, disparity data is retrieved with images the left and right cameras (along the left and right channels) and the relevant images are synchronized to compensate the delay of step 112 disparity from the stereo processing (step 201). In order to achieve that, a memory and a delay buffer management may be implemented so that all information retrieved from the left and right cameras along with the disparity information may be available for a given area (neighborhood) surrounding a pixel of interest. Possibly, more than one disparity candidate may be available for that area surrounding the pixel of interest. Optionally, a number of disparity candidates may be determined by using subsampling techniques and/or different measurement methodology to be associated with different disparity candidates. For example, the disparity data obtained from stereo block 112 may be such that it is suitable for low-noise low-resolution processing.

Next, in step 202 the disparity is used to determine contours of one or more objects for a low-noise image. These contours may be used to distinguish between objects that are in foreground of the image or in its background, also between objects present at different depths with respect to the camera that captured the image. The disparity candidates that available around the contours may belong to different objects, while disparity candidates associated with pixels of the object that are located relatively far from its edges (contour), may belong to that one object, and hence belong to smaller disparity range group.

Following step 202, a search window is opened around a selected pixel of interest (step 203) in order to enable identifying disparity candidates associated with objects that are present at different depths of the image, and wherein these objects are located at the vicinity of the object whose contour was determined in step 202. The search window size may be different than the window used for computing low-noise disparity, and optionally its size may be further adapted to the disparity level of the selected pixel of interest.

In step 204, values of the candidates of disparity are determined, wherein these values may correspond to chosen hypothesis associated with the search window. For example, one may assume that the search window contains between 1 to 3 planar objects, objects best estimated by second order splines, irregular objects like human fingers or other suitable objects. In addition, one may assume that the objects that are included within the search window, are characterized by the minimal and maximal disparity values associated with each object.

In step 205, the chosen hypothesis are tested in order to select the hypothesis which best describes the pixel and its surrounding. For example, such testing can be done by using a high-resolution adaptive block matching of the area located around the selected pixel of interest.

The various steps included in FIG. 2 referred to hereinabove, are further discussed in more details as part of the following description.

Figure 3:
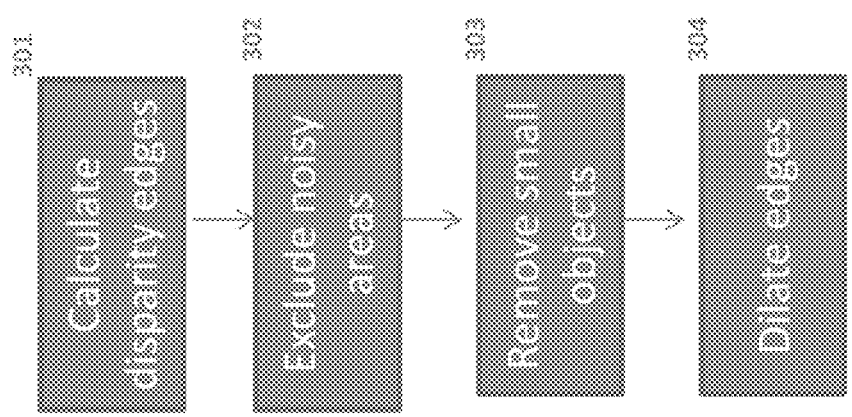
FIG. 3—is a flow chart demonstrating an embodiment for detecting objects' contours.

FIG. 3 exemplifies a flow chart of an embodiment for carrying out step 202 (determining the contours of one or more objects for a low-noise image).

In step 301, the disparity edges are calculated by using for example an edge detector like Scharr filter or simply by considering changes in disparity beyond a given threshold.

The Scharr filter (a.k.a. Scharr operator), or a closely related Sobel operator, is used in image processing particularly as part of edge detection algorithms where it creates an image emphasizing the object edges. Technically, it is a discrete differentiation operator for computing an approximation of the gradient of the image intensity function. At each point in the image, the result of the Scharr-filter is either the corresponding gradient vector or the norm of this vector.

According to certain embodiments, the computations are performed separately on a first and on a second disparity candidates and the edges are merged. If there is a transition from a valid to an invalid disparity and vice versa, such a transition may indicate having an occlusion or a projector shadow which might also generate an edge. Optionally, the edge threshold may be adaptive to match the number of edges found within a given pixel neighborhood.

Next, in step 302, noisy areas are excluded from the processing. This can be done for example by checking the number of edges within a given neighborhood. If the number of edges in that neighborhood is above a pre-defined threshold, that neighborhood is considered to be a noisy neighborhood. Optionally, noisy neighborhoods may be processed while applying larger, semi-global disparity masks to generate low-noise disparity if an additional iteration is desired in the process of searching an appropriate disparity candidate.

In step 303, small objects are removed, for example, objects which are below the resolution applied in the hypothesis testing as discussed above in step 205.

Next, in step 304 edges are dilated to include smaller objects and inner edges. For example, in a comb-like structures that include a human hand at a substantial distance. All objects within the dilated edges mask may belong to objects at several depths, and accurate contour detection may be beneficial while carrying out this step.

Figure 4:
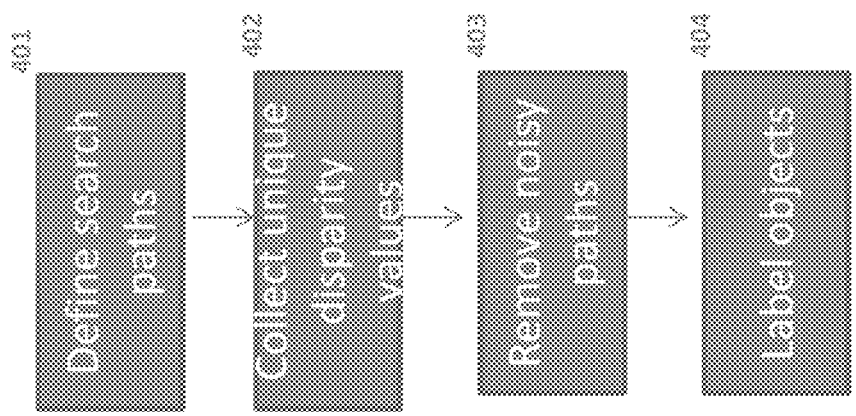
FIG. 4—is a flow chart demonstrating an embodiment of a procedure for opening a search area (window)

FIG. 4 exemplifies a flow chart of an embodiment for carrying out step 203 (opening a search window around a selected pixel of interest).

In step 401, search paths are defined. The search paths may be for example horizontal, vertical or diagonal paths of a given length. Since many objects are directional, using different paths may return different disparity candidates.

Unique disparity values are collected along the search paths (step 402). These unique disparity values may be used in calculating some further statistics.

Noisy paths are then removed (step 403), including removing paths that have few valid disparity points from suggesting disparity candidates. For example, if only less than a quarter of the disparity points (values) along a given path are determined to be valid, that search path may be considered as one that does not provide a valid disparity candidate.

Next, the objects are labeled (step 404) according to a disparity histogram. By some embodiments, the values of the parameters minimal, maximal and average disparity along a given path provide disparity candidates. Optionally, the disparity statistics is tested for unimodal or bimodal distribution and each modality of disparity points provides a different candidate based on a pre-defined curve fit. Each disparity candidate may be labeled according to the respective search path and modality. Also, disparity candidates of several modalities may be merged.

Figure 5:
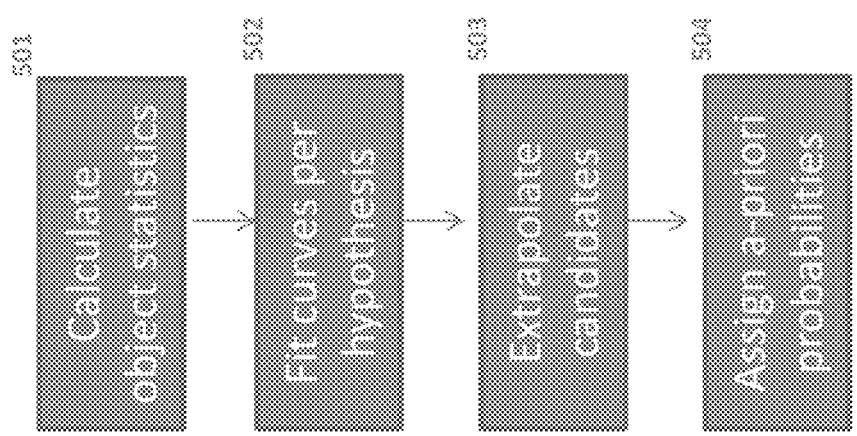
FIG. 5—is a flow chart demonstrating an embodiment for detecting disparity candidates.

FIG. 5 exemplifies a flow chart of an embodiment for carrying out step 204 (determining values of the disparity candidates).

First, statistics relating to the object are calculated (step 501) including the estimated number of objects which are included in the search window, the estimated number of invalid paths in the area and some further information.

In step 502, curves are fitted per the chosen hypothesis. There may be several optional hypothesis, such as for example:
(1) Candidate has a value that was provided by original low-noise process;
(2) Candidate is invalid;
(3) Candidate belongs to one of the objects found by carrying out a linear fitting of the points within the search path; and
(4) Candidate belongs to one of the objects found by a parabolic fitting of the points within the search path.

The candidates are then extrapolated (step 503) by calculating the candidate's disparity value according to each hypothesis.

Then, a-priori probabilities are assigned bases on data that fit to the original hypothesis (step 504).

Figure 6:
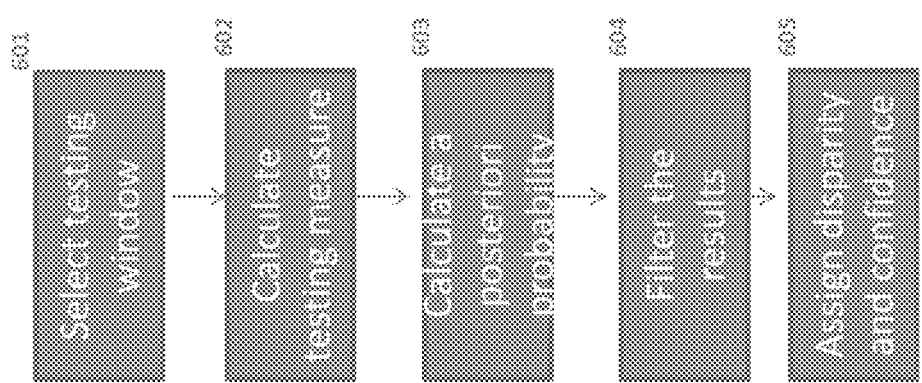
FIG. 6—demonstrates steps in hypothesis testing according to an embodiment of the present invention.

FIG. 6 exemplifies a flow chart of an embodiment for carrying out step 205 (testing the chosen hypothesis).

In step 601, a testing window is selected, for example a 5×5 window around a selected pixel of interest. optionally, masks may be used, and the mask values may be set according to the image grayscale level.

Testing measure is calculated (step 602) over the testing window, including some combination of SAD and Census measures.

A posteriori probability is then calculated (step 603) based on initial fit a-priori probability and the testing window measure. For example Bayesian models may be used. A Bayesian model is a probabilistic graphical model (a type of statistical model) that represents a set of random variables and their conditional dependencies via a directed acyclic graph (DAG).

The results are then filtered (step 604) in order to reduce spatial disparity noise. Optionally, belief propagation or Markov random field processing may be used to remove disparity noise.

A Markov random field is a set of random variables having a Markov property described by an unidirectional graph. A Markov random field is similar to a Bayesian model in its representation of dependencies; the differences being that Bayesian models are directed and acyclic, whereas Markov models are undirected and may be cyclic. Thus, a Markov model can represent certain dependencies that a Bayesian model cannot (such as cyclic dependencies); on the other hand, it cannot represent certain dependencies that a Bayesian model can (such as induced dependencies).

In some embodiments, local median over small adaptive window or non-local means may be used in order to reduce the disparity noise. Optionally, a Random sample consensus (RANSAC) fit of a local model may be used to remove the noise and increase subpixel disparity accuracy. RANSAC is an iterative method to estimate parameters of a mathematical model from a set of observed data which contains outliers. It is a non-deterministic algorithm in the sense that it produces a reasonable result only with a certain probability, with this probability increasing as more iterations are allowed.

Then, disparity value and confidence are assigned based on a posteriori probability and filtering result (step 605).

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for reconstructing a three dimensional image, said method comprises the steps of:
receiving a pair of stereoscopic images captured essentially simultaneously by two image capturing devices;
retrieving disparity data from said pair of stereoscopic images and calculating disparity edges therefrom based on intensity gradients that exist between pixels comprised in said stereoscopic images;
using the calculated disparity edges to determine contours of an object present in the pair of the stereoscopic images captured;
selecting at least one pixel belonging to said object;
establishing a search area at the vicinity of the at least one selected pixel to enable identifying disparity candidates associated with objects located at the vicinity of said object whose contours were determined, wherein a size of the search area is adapted to a disparity level of the selected at least one pixel;
determining values for the identified disparity candidates, wherein the determined values correspond to one or more chosen hypothesis associated with said search area;
testing the one or more chosen hypothesis and selecting a hypothesis which best fits the at least one selected pixel and its neighboring pixels;
executing a stereo matching algorithm using data retrieved from the pair of corresponding captured images while using the values of one or more identified disparity candidates that correspond to the chosen hypothesis; and
reconstructing the three dimensional image based on the results of the stereo matching algorithm.

2. The method of claim 1, wherein said method comprises an iterative process which comprises receiving data that relates to disparity candidates obtained from a low-noise iteration and executing a new high-resolution iteration.

3. The method of claim 1, wherein said method comprises retrieving data that relates to disparity candidates over a group of pixels present in the area located at the vicinity of the at least one selected pixel.

4. The method of claim 3, further comprising a step of selecting a subset of disparity candidates from among the retrieved data that relates to said disparity, for re-evaluating said at least one selected pixel.

5. The method of claim 1, wherein said step of testing the one or more chosen hypothesis comprises using a high-resolution adaptive block matching of the area located around the at least one selected pixel.

6. The method of claim 1, wherein said objects located at the vicinity of the object whose contour was determined are present at different depths of the image.

7. The method of claim 1, wherein said disparity edges are calculated by using an edge detector or by taking into account changes that occurred in said disparity data that exceed a pre-determined threshold, or any combination thereof.

8. The method of claim 1, wherein said disparity edges are calculated by using a discrete differentiation operator for computing an approximation of intensities' gradients in the stereoscopic images.

9. A system for reconstructing a three dimensional image, the system comprising:
at least two image capturing devices for capturing essentially simultaneously at least two stereoscopic images;
at least one processor configured to:
retrieve disparity data from said at least two stereoscopic images;
calculating disparity edges therefrom based on intensity gradients that exist between pixels comprised in said stereoscopic images;
apply retrieved the calculated disparity edges to determine contours of an object present in the at least two stereoscopic images captured;
select at least one pixel belonging to the object;
establish a search area at the vicinity of the at least one selected pixel to enable identifying disparity candidates associated with objects located at the vicinity of said object whose contours were determined, wherein a size of the search area is adapted to a disparity level of the selected at least one pixel;
determine values for the identified disparity candidates, wherein the determined values correspond to one or more chosen hypothesis associated with said search area;
test the one or more chosen hypothesis and select a hypothesis which best describes the at least one selected pixel and its neighboring pixels;
execute a stereo matching algorithm using data retrieved from the at least two captured images while using the values of one or more identified disparity candidates that correspond to the chosen hypothesis; and
reconstruct the three dimensional image based on the results of the stereo matching algorithm;
a memory means configured for storing information retrieved from the at least two image capturing devices along with disparity information that relates to said search area; and
a delay buffer configured to enable synchronization between data received from the at least two image capturing devices.

10. The system of claim 9, wherein the at least one processor is further configured to determine that disparity candidates available around the contours belong to different objects, while disparity candidates associated with pixels located relatively far from the determined contours belong to said object.

11. The system of claim 10, wherein the at least one processor is further configured to establish a smaller search area for the pixels located relatively far from the determined contours.

12. The system of claim 9, wherein the size of the search area is different than a size of an area used for computing low-noise disparity.

13. The system of claim 9, wherein the at least one processor is further configured to determine depth from the at least two captured images.

14. The system of claim 9, wherein the at least one processor is further configured to determine a depth of the three dimensional image by which low-noise disparity candidates are selected over a certain area for a secondary high-resolution disparity search carried out over selected candidates.

15. The system of claim 9, wherein the at least one processor is further configured to determine a depth of the three dimensional image by selecting a disparity calculating mechanism which is adapted to enable balancing between noise level and resolution level according to user preferences.

* * * * *